US012593369B2

(12) United States Patent
Matsumura et al.

(10) Patent No.: US 12,593,369 B2
(45) Date of Patent: Mar. 31, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 410 days.

(21) Appl. No.: 18/043,606

(22) PCT Filed: Sep. 11, 2020

(86) PCT No.: PCT/JP2020/034546
§ 371 (c)(1),
(2) Date: Mar. 1, 2023

(87) PCT Pub. No.: WO2022/054247
PCT Pub. Date: Mar. 17, 2022

(65) Prior Publication Data
US 2023/0309178 A1 Sep. 28, 2023

(51) Int. Cl.
*H04W 76/20* (2018.01)
*H04W 72/23* (2023.01)
*H04W 88/02* (2009.01)

(52) U.S. Cl.
CPC ........... *H04W 76/20* (2018.02); *H04W 72/23* (2023.01); *H04W 88/02* (2013.01)

(58) Field of Classification Search
CPC ..... H04W 76/20; H04W 72/23; H04W 88/02; H04W 72/04; H04W 72/12; H04W 72/21; H04W 72/30; H04W 72/51; H04W 76/10;

H04W 76/19; H04W 76/27; H04W 52/14; H04W 52/08; H04W 52/24; H04W 56/00; H04L 5/00; H04L 1/16; H04L 1/18; H04L 43/08
USPC ......................................................... 370/329
See application file for complete search history.

(56) References Cited

U.S. PATENT DOCUMENTS

| | | | | |
|---|---|---|---|---|
| 11,109,223 | B2 * | 8/2021 | Zhou | H04L 5/0091 |
| 11,115,973 | B2 * | 9/2021 | Jin | H04L 5/0096 |
| 11,324,028 | B2 * | 5/2022 | Venugopal | H04L 1/1825 |
| 11,343,037 | B2 * | 5/2022 | Manolakos | H04L 5/0051 |
| 11,412,501 | B2 * | 8/2022 | Zhou | H04B 7/088 |
| 12,250,668 | B2 * | 3/2025 | Oteri | H04B 7/0695 |
| 2021/0067979 | A1 * | 3/2021 | Rahman | H04L 5/0053 |

(Continued)

OTHER PUBLICATIONS

International Search Report issued in PCT/JP2020/034546 on Mar. 23, 2021 (2 pages).

(Continued)

*Primary Examiner* — Man U Phan
(74) *Attorney, Agent, or Firm* — Osha Bergman Watanabe & Burton LLP

(57) ABSTRACT

A terminal according to one aspect of the present disclosure includes a receiving section that receives a first list and a second list of transmission configuration indication (TCI) states, and a control section that applies one first TCI state in the first list to uplink and downlink and applies one second TCI state in the second list to uplink and downlink. According to one aspect of the present disclosure, it is possible to appropriately determine information related to QCL.

5 Claims, 16 Drawing Sheets

(56)     References Cited

U.S. PATENT DOCUMENTS

| 2023/0103557 A1* | 4/2023 | Li | H04B 7/088 |
| | | | 370/329 |
| 2023/0216626 A1* | 7/2023 | Muruganathan | H04W 72/232 |
| | | | 370/328 |
| 2023/0291533 A1* | 9/2023 | Zhou | H04B 7/088 |
| 2023/0292250 A1* | 9/2023 | Määttänen | H04W 52/242 |
| 2023/0319839 A1* | 10/2023 | Nilsson | H04L 5/0091 |
| | | | 370/329 |
| 2025/0126623 A1* | 4/2025 | Lee | H04W 4/06 |

OTHER PUBLICATIONS

Written Opinion of the International Searching Authority issued in PCT/JP2020/034546 on Mar. 23, 2021 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+(plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a user terminal (terminal, User Equipment (UE)) that controls transmission/reception processing on the basis of information related to quasi-co-location (QCL) (QCL assumption/Transmission Configuration Indication (TCI) state/spatial relation) is under study.

However, there is a case where the information related to the QCL is indefinite. Unless the information related to the QCL is definite, communication quality reduction, throughput reduction, and the like may occur.

Thus, an object of the present disclosure is to provide a terminal, a radio communication method, and a base station that appropriately determine information related to QCL.

Solution to Problem

A terminal according to one aspect of the present disclosure includes a receiving section that receives a first list and a second list of transmission configuration indication (TCI) states, and a control section that applies one first TCI state in the first list to uplink and downlink and applies one second TCI state in the second list to uplink and downlink.

Advantageous Effects of Invention

According to one aspect of the present disclosure, it is possible to appropriately determine information related to QCL.

BRIEF DESCRIPTION OF DRAWINGS

FIG. 5 is a diagram to show an example of a common beam determination method according to aspect 2-1a.

FIG. 7 is a diagram to show an example of a common beam determination method according to aspect 2-2a.

Figure 1:
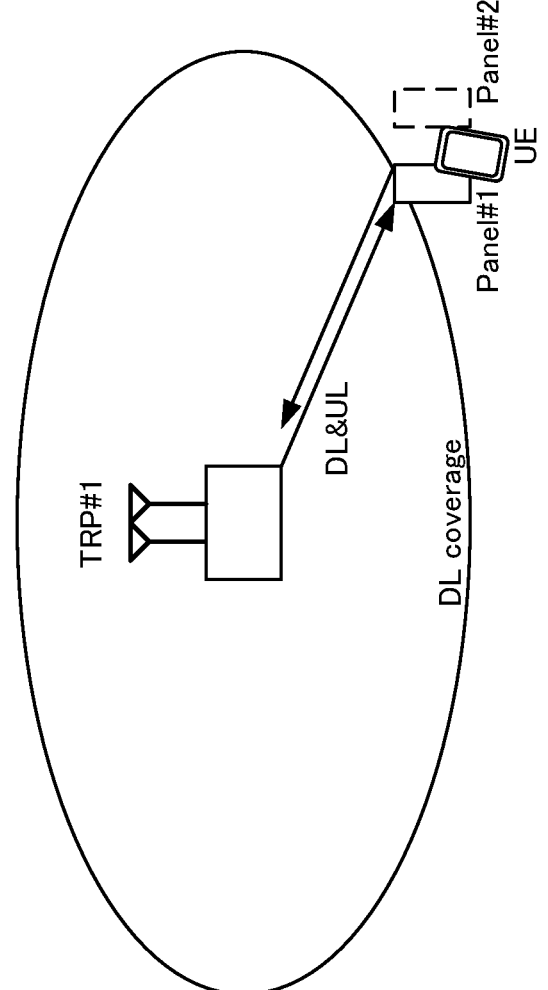
FIG. 1 is a diagram to show an example of a common beam for both DL and UL.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is expressed as a signal/channel) based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a measurement reference signal (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS to have a relationship of QCL type X with (a DMRS for) a given channel/signal, and this RS may be referred to as a QCL source of QCL type X in the TCI state.

(Pathloss RS)

Pathloss $PL_{b,f,c}$ ($q_d$) [dB] in transmit power control for each of the PUSCH, PUCCH, and SRS is calculated by the UE with index $q_d$ of a reference signal (RS, pathloss reference RS (PathlossReferenceRS)) for a downlink BWP associated with active UL BWP b for carrier f in serving cell c. In the present disclosure, the pathloss reference RS, a pathloss (PL)-RS, index $q_d$, an RS used for pathloss calculation, and an RS resource used for pathloss calculation may be interchangeably interpreted. In the present disclosure, calculate, estimate, measure, and track may be interchangeably interpreted.

Whether an existing system for higher layer filtered RSRP for pathloss measurement is changed when the pathloss RS is updated by a MAC CE is under study.

When the pathloss RS is updated by the MAC CE, pathloss measurement based on L1-RSRP may be applied. At an available timing after the MAC CE for updating the pathloss RS, higher layer filtered RSRP may be used for pathloss measurement, and L1-RSRP may be used for pathloss measurement before the higher layer filtered RSRP is applied. At the available timing after the MAC CE for updating the pathloss RS, higher layer filtered RSRP may be used for pathloss measurement, and higher layer filtered RSRP for a previous pathloss RS may be used before that timing. The higher layer filtered RSRP may be used for pathloss measurement in a manner similar to that of operation in Rel. 15, and the UE may track all pathloss RS candidates configured by RRC. A maximum number of pathloss RSs configurable by the RRC may depend on a UE capability. When the maximum number of pathloss RSs configurable by the RRC is X, pathloss RS candidates being X or less may be configured by the RRC, and a pathloss RS may be selected by the MAC CE from the configured pathloss RS candidates. The maximum number of pathloss RSs configurable by the RRC may be 4, 8, 16, 64, or the like.

In the present disclosure, the higher layer filtered RSRP, filtered RSRP, and layer 3 filtered RSRP may be interchangeably interpreted.

(Default TCI State/Default Spatial Relation/Default PL-RS)

In an RRC connected mode, in both a case where information of TCI in DCI (higher layer parameter TCI-PresentInDCI) is set to "enabled" and a case where the information of TCI in DCI is not configured, when time offset between reception of DL DCI (DCI to schedule a PDSCH) and a corresponding PDSCH (PDSCH scheduled by the DCI) is less than a threshold value (timeDurationForQCL) (application condition, first condition), and in a case of non-cross carrier scheduling, a TCI state (default TCI state) for the PDSCH may be a TCI state with the lowest CORESET ID in the latest slot in an active DL BWP for that CC (for a specific UL signal). Otherwise, the TCI state (default TCI state) for the PDSCH may be a TCI state with the lowest TCI state ID of a PDSCH in an active DL BWP for a scheduled CC.

In Rel. 15, individual MAC CEs for a MAC CE for PUCCH spatial relation activation/deactivation and a MAC CE for SRS spatial relation activation/deactivation are necessary. A PUSCH spatial relation follows the SRS spatial relation.

In Rel. 16, at least one of the MAC CE for PUCCH spatial relation activation/deactivation and the MAC CE for SRS spatial relation activation/deactivation may not be used.

If both a spatial relation and a PL-RS for a PUCCH are not configured in FR2 (application condition, second condition), default assumption for the spatial relation and PL-RS (default spatial relation and default PL-RS) is applied to the PUCCH. If both a spatial relation and a PL-RS for an SRS (SRS resource for the SRS or SRS resource corresponding to SRI in DCI format 0_1 to schedule a PUSCH) are not configured in FR2 (application condition, second condition), default assumption for the spatial relation and PL-RS (default spatial relation and default PL-RS) is applied to the PUSCH scheduled by DCI format 0_1, and the SRS.

If a CORESET is configured in an active DL BWP on that CC (application condition), the default spatial relation and default PL-RS may be a TCI state or QCL assumption for a CORESET having the lowest CORESET ID in the active DL BWP. If no CORESET is configured in the active DL BWP on that CC, the default spatial relation and default PL-RS may be an active TCI state having the lowest ID for a PDSCH in the active DL BWP.

In Rel. 15, a spatial relation for a PUSCH scheduled by DCI format 0_0 follows a spatial relation for a PUCCH resource having the lowest PUCCH resource ID, out of active spatial relations for PUCCHs on the same CC. A network needs to update PUCCH spatial relations on all SCells even when the PUCCH is not transmitted on the SCell.

In Rel. 16, PUCCH configuration for the PUSCH scheduled by DCI format 0_0 is unnecessary. When an active PUCCH spatial relation or a PUCCH resource for the PUSCH scheduled by DCI format 0_0 is absent on an active UL BWP in that CC (application condition, second condition), the default spatial relation and default PL-RS are applied to the PUSCH.

A condition for application of the default spatial relation/default PL-RS for the SRS may include that an information element for enabling a default beam pathloss for the SRS (higher layer parameter enableDefaultBeamPlForSRS) is set to "enabled." A condition for application of the default spatial relation/default PL-RS for the PUCCH may include a case that an information element for enabling a default beam pathloss for the PUCCH (higher layer parameter enableDefaultBeamPlForPUCCH) is set to "enabled." A condition for application of the default spatial relation/default PL-RS for the PUSCH scheduled by DCI format 0_0 may include a case that an information element for enabling a default beam pathloss for the PUSCH scheduled by DCI format 0_0 (higher layer parameter enableDefaultBeamPlForPUSCH0_0) is set to "enabled."

The above-described threshold value may be referred to as a time length (time duration) for QCL, "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, or the like.

(Multi-TRP)

For NR, one or a plurality of transmission/reception points (TRPs) (multiple TRPs (multi TRP (MTRP))) that perform DL transmission to a UE by using one or a plurality of panels (multiple panels) are under study. Also, the UE that performs UL transmission by using one or a plurality of panels for one or the plurality of TRPs is under study.

Note that the plurality of TRPs may correspond to the same cell identifier (ID), or may correspond to different cell IDs. The cell ID may be a physical cell ID, or may be a virtual cell ID.

The multiple TRPs (for example, TRP #1 and TRP #2) may be connected to each other by an ideal/non-ideal backhaul to exchange information, data, and the like. From respective TRPs of the multiple TRPs, different codewords (Code Words (CWs)) and different layers may be transmitted. As a mode of multi-TRP transmission, non-coherent joint transmission (NCJT) may be used.

In NCJT, for example, TRP #1 performs modulation mapping and layer mapping for a first codeword to transmit a first number of layers (for example, 2 layers) and to transmit a first PDSCH by using first precoding. TRP #2 performs modulation mapping and layer mapping for a second codeword to transmit a second number of layers (for example, 2 layers) and to transmit a second PDSCH by using second precoding.

Note that a plurality of PDSCHs (multiple PDSCHs) transmitted by NCJT may be defined as PDSCHs partially or fully overlapping with each other in relation to at least one of time and frequency domains. In other words, a first PDSCH from a first TRP and a second PDSCH from a second TRP may overlap with each other in at least one of time and frequency resources.

It may be assumed that these first PDSCH and second PDSCH are not in a quasi-co-location (QCL) relationship (not quasi-co-located). Reception of the multiple PDSCHs may be interpreted as simultaneous reception of PDSCHs other than a given QCL type (for example, QCL type D).

A plurality of PDSCHs (which may be referred to as multiple PDSCHs) from the multiple TRPs may be scheduled by using one piece of DCI (single DCI, single PDCCH) (single master mode, multi-TRP based on single-DCI (single-DCI based multi-TRP)). A respective plurality of PDSCHs from the multiple TRPs may be scheduled by using a plurality of pieces of DCI (multiple DCI, multiple PDCCHs) (multi-master mode, multi-TRP based on multi-DCI (multi-DCI based multi-TRP)).

According to such a multi-TRP scenario, more flexible transmission control using a channel with satisfactory quality is possible.

In order to support intra-cell (having the same cell ID) and inter-cell (having different cell IDs) multi-TRP transmissions based on multiple PDCCHs, in RRC configuration information for linking a plurality of pairs of PDCCHs and PDSCHs having multiple TRPs, one control resource set (CORESET) in PDCCH configuration information (PDCCH-Config) may correspond to one TRP.

(Unified TCI Framework)

According to a unified TCI framework, UL and DL channels can be controlled by a common framework. Instead of defining a TCI state or a spatial relation for each channel as in Rel. 15, the unified TCI framework may indicate a common beam and apply the common beam to all UL and DL channels, or may apply a UL common beam to all UL channels and apply a DL common beam to all DL channels.

One common beam for both DL and UL or a DL common beam and a UL common beam (two common beams in total) are under study.

In an example of FIG. 1, the UE includes panel #1 and panel #2. In this example, the UE uses a common beam of panel #1 for both DL and UL.

As use cases for the common beam, use case 0, use case 1, and use case 2 below are under study.

[Use Case 0]

The UE uses different UL beams resulting from maximum permitted exposure (MPE).

Figure 2:
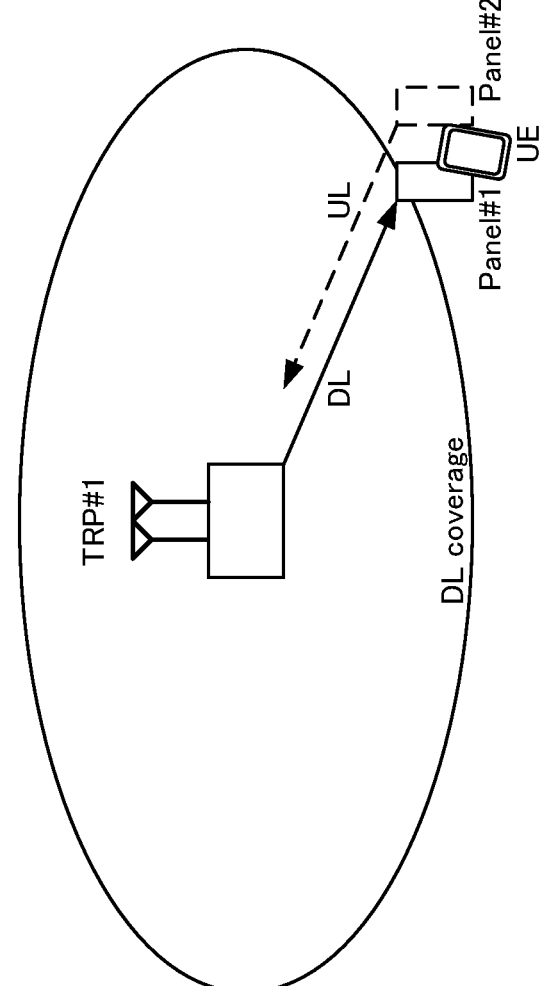
FIG. 2 is a diagram to show an example of use case 0.

In an example of FIG. 2, UL of panel #1 receives an MPE issue, and the UE uses panel #2 for UL.

[Use Case 1]

The UE uses different UL beams resulting from UL signal strength.

Figure 3:
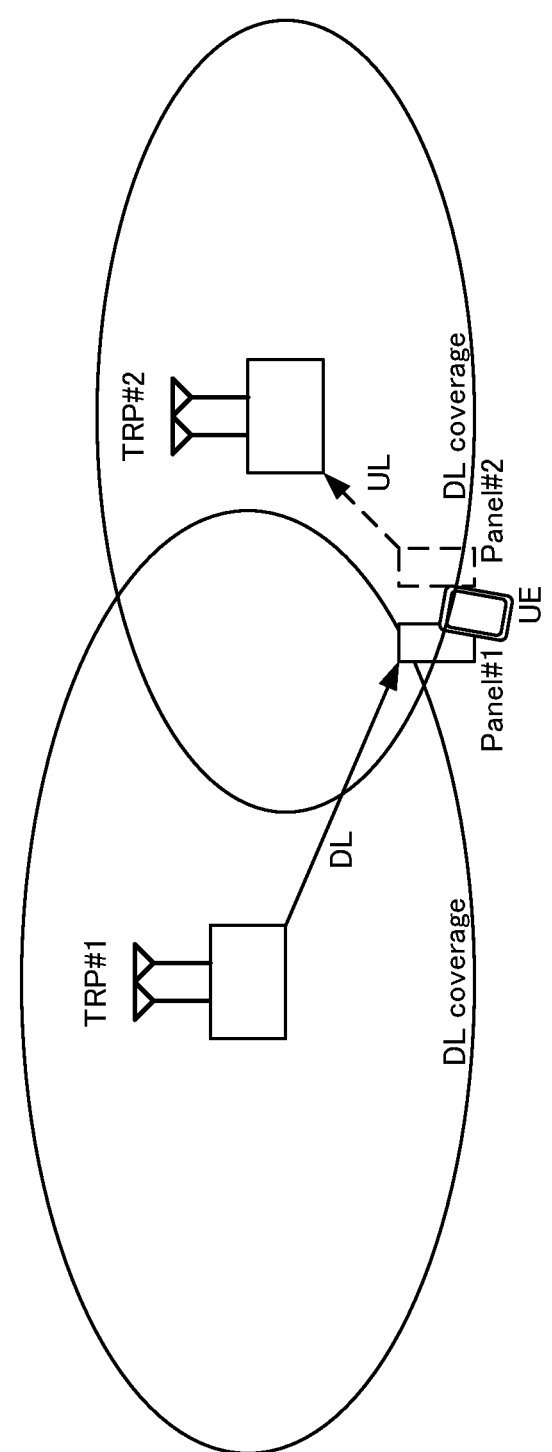
FIG. 3 is a diagram to show an example of use case 1.

In an example of FIG. 3, a distance between the UE and TRP (cell, base station) #1 is longer than a distance between the UE and TRP #2. Here, L1-RSRP of panel #1 is higher than L1-RSRP of panel #2, and UL transmit power of panel #2 is higher than UL transmit power of panel #1. The UE uses panel #1 for DL from TRP #1, and uses panel #2 for UL to TRP #2.

[Use Case 2]

The UE uses different UL beams resulting from UL load balance.

Figure 4:
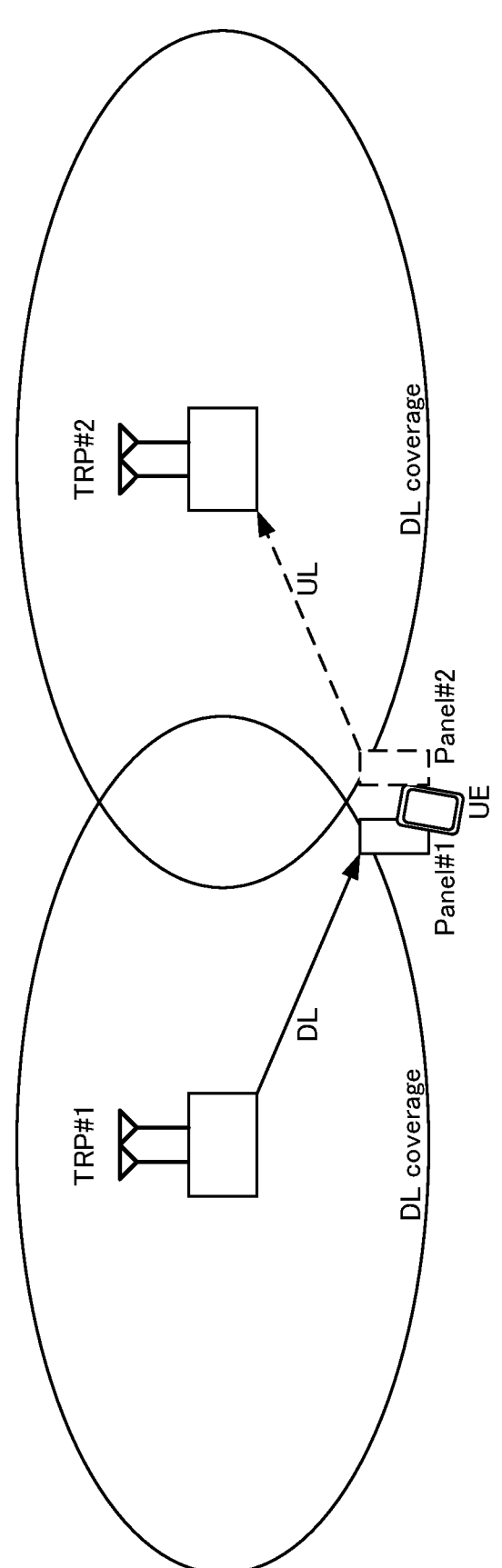
FIG. 4 is a diagram to show an example of use case 2.

In an example of FIG. 4, L1-RSRP of panel #1 is higher than L1-RSRP of panel #2, and UL load of panel #2 is lower than UL load of panel #1. The UE uses panel #1 for DL from TRP #1, and uses panel #2 for UL to TRP #2.

It is conceivable that more scenarios having different requirements are to be studied. For example, in multi-TRP transmission, high-speed train (HST) transmission, inter-cell mobility in a period in which there is a possibility that the UE connects to two cells, and the like, common beams may be different for respective TRPs and cells.

In this case, the UE may include multiple panels for FR2. In this case, common beam may be different for respective UE panels.

However, a TCI state determination method for multiple TRPs is indefinite. Unless the TCI state determination method is definite, a discrepancy in TCI states may occur between the UE and a base station, and deterioration in communication quality, deterioration in throughput, and the like may occur.

Thus, the inventors of the present invention came up with the idea of a TCI state determination method.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, to support, to control, to be able to control, to operate, and to be able to operate may be interchangeably interpreted.

In the present disclosure, configure, activate, update, indicate, enable, specify, and select may be interchangeably interpreted.

In the present disclosure, a MAC CE and an activation/deactivation command may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a spatial setting, a TCI state, a UL TCI state, a unified TCI state, a unified beam, a common TCI state, a common beam, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a source of a DL-RS, an SSB, a CSI-RS, and an SRS may be interchangeably interpreted.

UL DCI, DCI to schedule a UL channel (PUSCH), and DCI format 0_x (x=0, 1, 2, . . . ) may be interchangeably interpreted. DL DCI, DCI to schedule a DL channel (PDSCH), and DCI format 1_x (x=0, 1, 2, . . . ) may be interchangeably interpreted.

In the present disclosure, HARQ-ACK information, ACK, and NACK may be interchangeably interpreted.

In the present disclosure, a single TRP, a single-TRP system, single-TRP transmission, and a single PDSCH may be interchangeably interpreted. In the present disclosure, multiple TRPs (or multi-TRP), a multi-TRP system, multi-TRP transmission, and multiple PDSCHs (or multi-PDSCH) may be interchangeably interpreted. In the present disclosure, single DCI, a single PDCCH, multiple TRPs based on single DCI, and activation of two TCI states on at least one TCI codepoint may be interchangeably interpreted.

In the present disclosure, a single TRP, a channel using a single TRP, a channel using one TCI state/spatial relation, a case that multiple TRPs are not enabled by RRC/DCI, a case that a plurality of TCI states/spatial relations are not enabled by RRC/DCI, and a case that one CORESET pool index (CORESETPoolIndex) value is not configured for any CORESET, and any codepoint of a TCI field is not mapped to two TCI states may be interchangeably interpreted.

In the present disclosure, multiple TRPs (or multi-TRP), a channel using multiple TRPs, a channel using a plurality of TCI states/spatial relations, a case that multiple TRPs are enabled by RRC/DCI, a case that a plurality of TCI states/spatial relations are enabled by RRC/DCI, and at least one of multi-TRP based on single-DCI and multi-TRP based on multi-DCI may be interchangeably interpreted. In the present disclosure, multi-TRP based on multi-DCI and a case that one CORESET pool index (CORESETPoolIndex) value is configured for a CORESET may be interchangeably interpreted. In the present disclosure, multi-TRP based on single-DCI and a case that at least one codepoint of a TCI field is mapped to two TCI states may be interchangeably interpreted.

In the present disclosure, TRP 1 may correspond to CORESET pool index=0, or may correspond to the first TCI state out of two TCI states corresponding to one codepoint of a TCI field. TRP 2 may correspond to CORESET pool index=1, or may correspond to the second TCI state out of the two TCI states corresponding to one codepoint of the TCI field.

In the present disclosure, a link direction, downlink (DL), uplink (UL), and one of UL and DL may be interchangeably interpreted.

In the present disclosure, a pool, a set, a group, and a list may be interchangeably interpreted.

In the present disclosure, a common beam, a unified TCI state, a beam applicable to DL and UL, a beam applied to a plurality of channels, and a PL-RS may be interchangeably interpreted.

(Radio Communication Method)

When at least one of condition 1 and condition 2 below is satisfied, the UE may judge that the multi-TRP is multi-TRP based on multi-DCI. In this case, TRPs may be interpreted as CORESET pool indices.

[Condition 1]

One CORESET pool index is configured.

[Condition 2]

Two different values (for example, 0 and 1) of CORESET pool indices are configured.

When the following condition is satisfied, the UE may judge that the multi-TRP is multi-TRP based on single-DCI. In this case, two TRPs may be interpreted as two TCI states indicated by a MAC CE/DCI.

[Condition]

In order to indicate one or two TCI states for one codepoint of a TCI field in DCI, a "MAC CE for enhanced TCI state activation/deactivation for UE-specific PDSCH (Enhanced TCI states Activation/Deactivation for UE-specific PDSCH MAC CE)" is used.

DCI for common beam indication may be a UE-specific DCI format (for example, DL DCI format (for example, 1_1 or 1_2) or UL DCI format (for example, 0_1 or 0_2)), or may be a UE-group common DCI format.

At least one of beam (common beam) update indication and a beam (common beam) update timing may be applied to at least one of signal 1 to signal 4 below.

[Signal 1]

A DL channel. For example, at least one of a PDCCH/PDSCH, only a UE-specific (UE-specific search space (USS)) PDCCH, an arbitrary PDCCH including a UE-group common (common search space (CSS)) PDCCH, and an arbitrary PDCCH except CORESET 0 (zero).

[Signal 2]

A UL channel. For example, a PUCCH/PUSCH.

[Signal 3]

A radio link management (RLM)/beam failure detection (BFD) RS. The RLM/BFD RS may be updated by a MAC CE/DCI.

[Signal 4]

If two TCI states are indicated by a MAC CE/DCI for multi-TRP based on single-DCI, the two TCI states may be applied to a PDSCH. Only the first TCI state or only a TCI state having the lowest TCI state index may be applied to a PDCCH/PUCCH/PUSCH.

A pool of TCI states applicable to a plurality of channels/RSs may be configured for the UE. A TCI state pool for both UL and DL (joint TCI state pool) may be configured for the UE, or a TCI state pool for UL and a TCI state pool for DL (separate TCI state pools) may be configured for the UE.

First Embodiment

A UE may support a TRP-specific common beam (first TCI state and second TCI state) for DL and UL. The UE may use one common beam for each TRP. In a period of multi-TRP/HST transmission/inter-cell mobility, the UE may use two common beams in total.

A common beam for the DL and a common beam for the UL (two separate common beams) may be applied to design of the TRP-specific common beam. For example, DL common beam design may correspond to a common beam for one TRP for both of the DL and UL, and UL common beam design may correspond to a common beam for another TRP for both of the DL and UL. If new RRC signaling is configured, the UE may apply the separate common beams to the TRP-specific common beam.

A TCI state pool configured by RRC may be a pool (one or more lists) common to two TRPs, or may be separate pools (first list and second list) for respective TRPs.

A method for indicating the TRP-specific common beam may follow at least one of method 1 and method 2 below.

[Method 1]

The TRP-specific common beam may be configured/indicated by RRC and a MAC CE.

For multi-TRP based on single-DCI, the MAC CE may activate one or two TCI states. If two TCI state are activated, one TCI state is for one TRP. The first TCI state may be for the first TRP, and the second TCI state may be for the second TRP.

For multi-TRP based on multi-DCI, in order to activate one TCI state per TRP, the MAC CE may be transmitted for each TRP/CORESET pool index.

[Method 2]

The TRP-specific common beam may be configured/indicated by RRC, a MAC CE, and DCI.

For multi-TRP based on single-DCI, a method for indicating the TRP-specific common beam may follow at least one of method 2-1 and method 2-2 below.

[[Method 2-1]]

The MAC CE may activate M sets (first set and second set) of TCI states. For example, M may be 8, or may be another number. One set of TCI states may correspond to two TCI states. The DCI may be used for indication of one set of TCI states (two TCI states). A beam update timing may be reused for two TRPs.

[[Method 2-2]]

The MAC CE may activate M sets (first set and second set) of TCI states. For example, M may be 8, or may be another number. One set of TCI states may correspond to one or two TCI states. The DCI may be used for indication of one set of TCI states (one or two TCI states). This method may support dynamic switching between one common beam (single TRP) and two common beams (multiple TRPs).

For multi-TRP based on multi-DCI, in order to activate N TCI states per TRP, the MAC CE may be transmitted for each TRP. For example, N may be 8, or may be another number. The DCI may be used in order to indicate one TCI state for each TRP. The DCI may be associated with a CORESET pool index.

In method 1/2, for multi-TRP based on single-DCI, when the MAC CE/DCI indicates only one TCI state, the UE may follow at least one of operation 1 and operation 2 below.

[Operation 1]

The UE may fall back to one common beam for both DL and UL. Dynamic indication between one common beam and two common beams may be supported.

[Operation 2]

The indicated TCI state may be applied to only one TRP.

According to the first embodiment described above, the UE can appropriately use a common beam for multiple TRPs.

Second Embodiment

A UE may support TRP-specific and link-specific common beams. The UE may support four common beams in total. The UE may support one common beam for one TRP and one link direction. A link/link direction may be DL, or may be UL.

A DL or UL separate common beam may be applied to each TRP (in each TRP). The UE may support four common beams in total.

The UE may follow at least one of aspect 2-1a, aspect 2-1b, aspect 2-2a, aspect 2-2b, aspect 2-2c, and aspect 2-2d below.

<<Aspect 2-1a>>

A joint (united) common TCI state pool may be used. The joint common TCI state pool may include a common beam for both DL and UL.

The joint common TCI state pool may be a TRP-specific pool (first list and second list).

Figure 5:
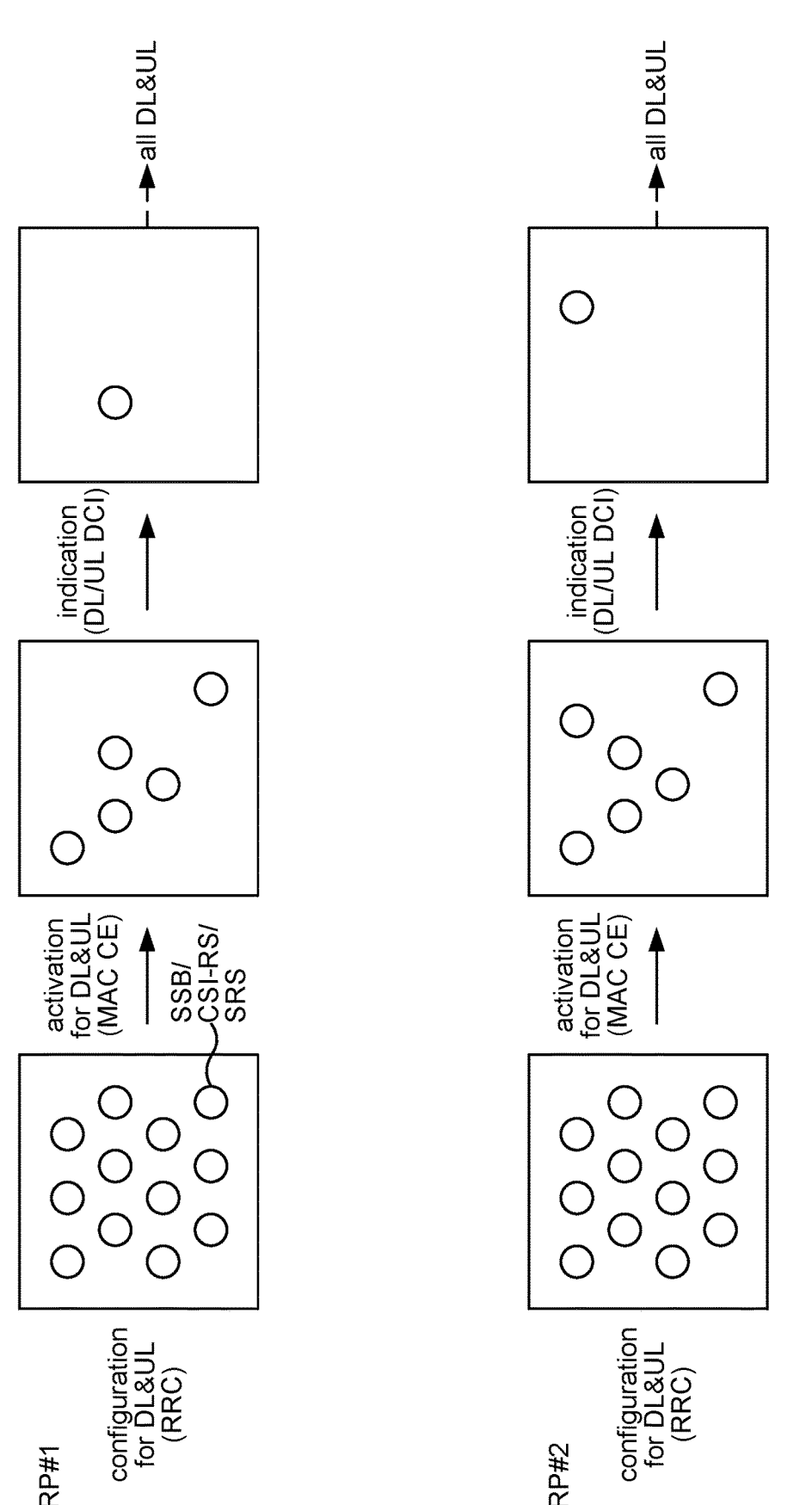

In an example of FIG. 5, one joint common TCI state pool is configured for each of TRP #1 and TRP #2.

A TCI state pool for both UL and DL may be configured for TRP #1 by RRC, a plurality of TCI states in the pool may be activated by a MAC CE, and one of the plurality of activated TCI states may be indicated by UL DCI or DL DCI. The indicated TCI state may be applied to all UL and DL channels/RSs for TRP #1.

A TCI state pool for both UL and DL may be configured for TRP #2 by RRC, a plurality of TCI states in the pool may be activated by a MAC CE, and one of the plurality of activated TCI states may be indicated by UL DCI or DL DCI. The indicated TCI state may be applied to all UL and DL channels/RSs for TRP #2.

<<Aspect 2-1b>>

A joint common TCI state pool may be used. The joint common TCI state pool may include a common beam for both DL and UL.

The joint common TCI state pool may be a TRP-common pool (one or more lists).

Figure 6:
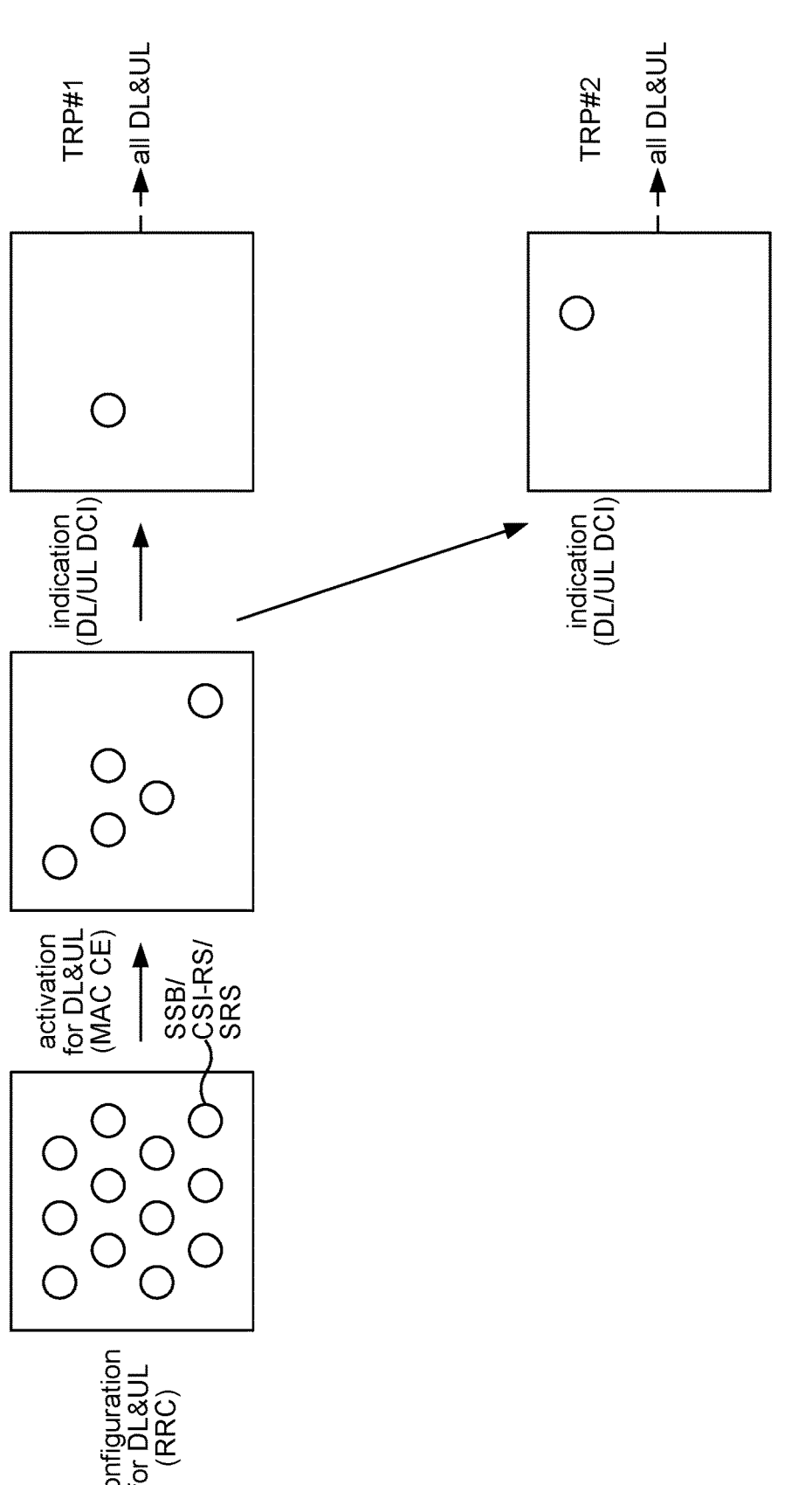
FIG. 6 is a diagram to show an example of a common beam determination method according to aspect 2-1b.

In an example of FIG. 6, one joint common TCI state pool is configured for TRP #1 and TRP #2.

A TCI state pool for both UL and DL may be configured by RRC, and a plurality of TCI states in the pool may be activated by a MAC CE.

For TRP #1, one of the plurality of activated TCI states may be indicated by UL DCI or DL DCI. The indicated TCI state may be applied to all UL and DL channels/RSs for TRP #1.

For TRP #2, one of the plurality of activated TCI states may be indicated by the UL DCI or DL DCI. The indicated TCI state may be applied to all UL and DL channels/RSs for TRP #2.

<<Aspect 2-2a>>

Separate (different) common TCI state pools for respective UL and DL may be used. A separate common TCI state pool for the DL may include a DL common beam, and a separate common TCI state pool for the UL may include a UL common beam.

The separate common TCI state pools may be TRP-specific pools (first list, second list, third list, and fourth list).

Figure 7:
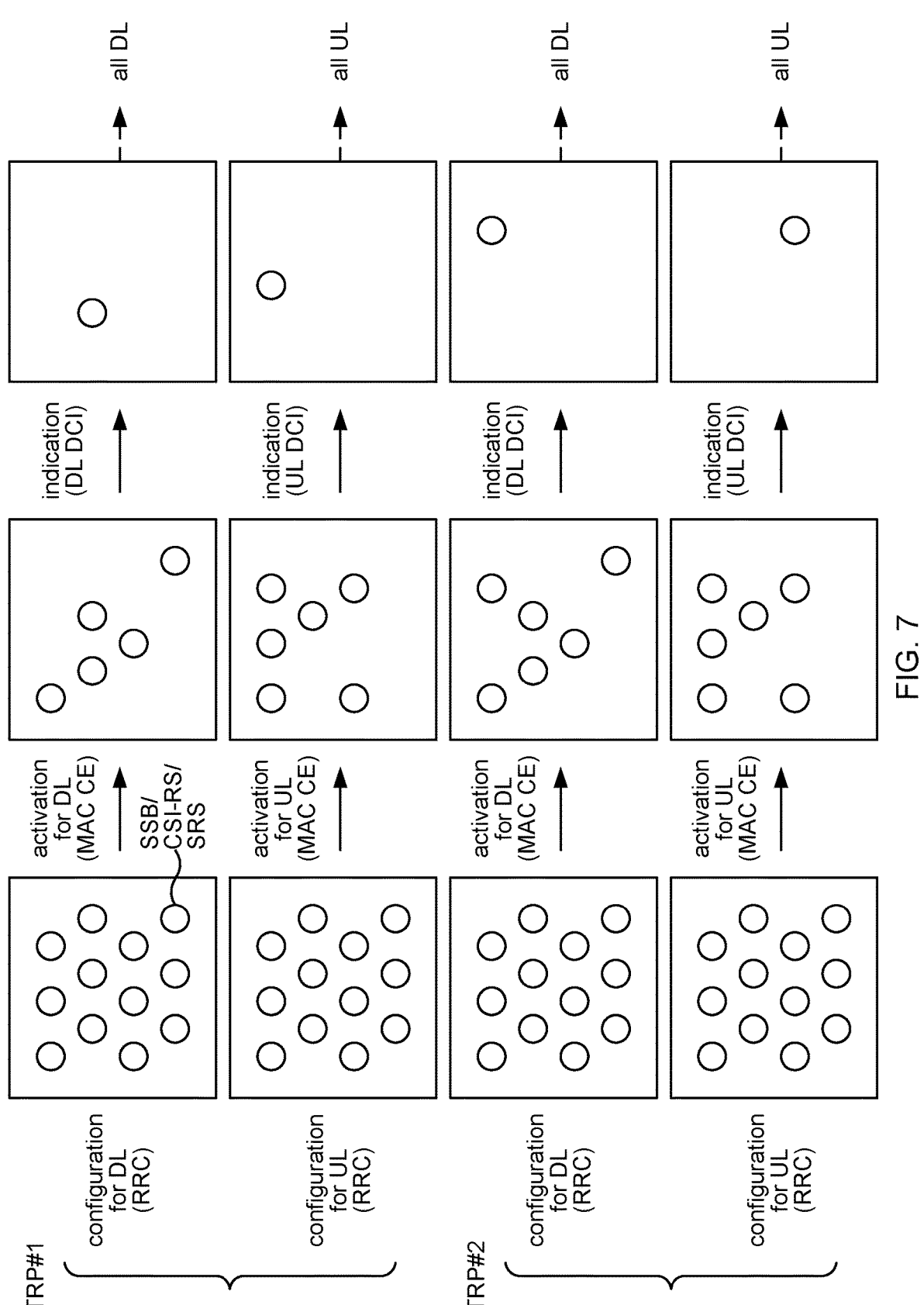

In an example of FIG. 7, a common TCI state pool for DL and a common TCI state pool for UL are configured for TRP #1, and a common TCI state pool for DL and a common TCI state pool for UL are configured for TRP #2.

A TCI state pool for the DL may be configured for TRP #1 by RRC, a plurality of TCI states in the pool may be activated by a MAC CE, and one (first TCI state) of the plurality of activated TCI states may be indicated by DL DCI. The indicated TCI state may be applied to all DL channels/RSs for TRP #1.

The UE may determine the TCI state for all DL channels/RSs for TRP #1 in accordance with this operation, or may determine a TCI state for each DL channel/RS for TRP #1 by using TCI state operation (TCI framework) in Rel. 16.

A TCI state pool for the UL may be configured by RRC for TRP #1, a plurality of TCI states in the pool may be activated by a MAC CE, and one (third TCI state) of the plurality of activated TCI states may be indicated by UL DCI. The indicated TCI state may be applied to all UL channels/RSs for TRP #1.

A TCI state pool for the DL may be configured for TRP #2 by RRC, a plurality of TCI states in the pool may be activated by a MAC CE, and one (second TCI state) of the plurality of activated TCI states may be indicated by DL DCI. The indicated TCI state may be applied to all DL channels/RSs for TRP #2.

The UE may determine the TCI state for all DL channels/RSs for TRP #2 in accordance with this operation, or may determine a TCI state for each DL channel/RS for TRP #2 by using TCI state operation (TCI framework) in Rel. 16.

A TCI state pool for the UL may be configured for TRP #2 by RRC, a plurality of TCI states in the pool may be activated by a MAC CE, and one (fourth TCI state) of the plurality of activated TCI states may be indicated by UL DCI. The indicated TCI state may be applied to all UL channels/RSs for TRP #2.

<<Aspect 2-2b>>

Separate (different) common TCI state pools for respective UL and DL may be used. A separate common TCI state pool for the DL may include a DL common beam, and a separate common TCI state pool for the UL may include a UL common beam.

The separate common TCI state pools may be TRP-specific pools (fifth list and sixth list). A plurality of active TCI states configured/indicated for one TRP by RRC/MAC CE may be common to UL and DL.

Figure 8:
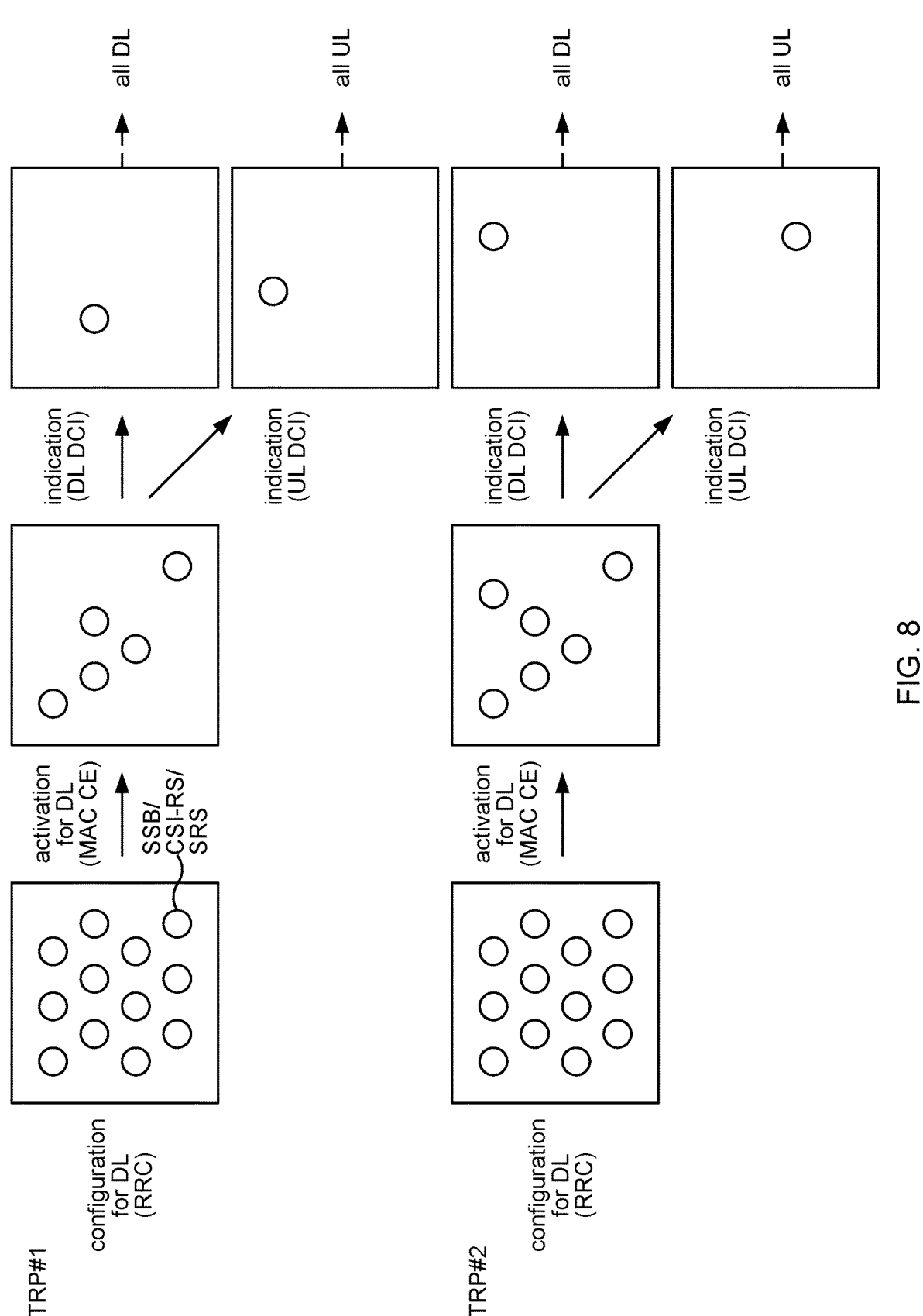
FIG. 8 is a diagram to show an example of a common beam determination method according to aspect 2-2b.

In an example of FIG. 8, a common TCI state pool for DL is configured for TRP #1, and a common TCI state pool for DL is configured for TRP #2.

A TCI state pool for the DL may be configured for TRP #1 by RRC, a plurality of TCI states in the pool may be activated by a MAC CE, and one (first TCI state) of the plurality of activated TCI states may be indicated by DL DCI. The indicated TCI state may be applied to all DL channels/RSs for TRP #1. One (third TCI state) of the plurality of activated TCI states may be indicated by UL DCI. The indicated TCI state may be applied to all UL channels/RSs for TRP #1.

The UE may determine the TCI state for all DL channels/RSs for TRP #1 in accordance with this operation, or may determine a TCI state for each DL channel/RS for TRP #1 by using TCI state operation (TCI framework) in Rel. 16.

A TCI state pool for the DL may be configured for TRP #2 by RRC, a plurality of TCI states in the pool may be activated by a MAC CE, and one (second TCI state) of the plurality of activated TCI states may be indicated by DL DCI. The indicated TCI state may be applied to all DL channels/RSs for TRP #2. One (fourth TCI state) of the plurality of activated TCI states may be indicated by the UL DCI. The indicated TCI state may be applied to all UL channels/RSs for TRP #2.

The UE may determine the TCI state for all DL channels/RSs for TRP #2 in accordance with this operation, or may determine a TCI state for each DL channel/RS for TRP #2 by using TCI state operation (TCI framework) in Rel. 16.

<<Aspect 2-2c>>

Separate (different) common TCI state pools for respective UL and DL may be used. A separate common TCI state pool for the DL may include a DL common beam, and a separate common TCI state pool for the UL may include a UL common beam.

The separate common TCI state pools may be TRP-specific pools (seventh list and eighth list). A plurality of active TCI states configured/indicated for one TRP by RRC/MAC CE may be common to all TRPs for the DL or UL.

13

Figure 9:
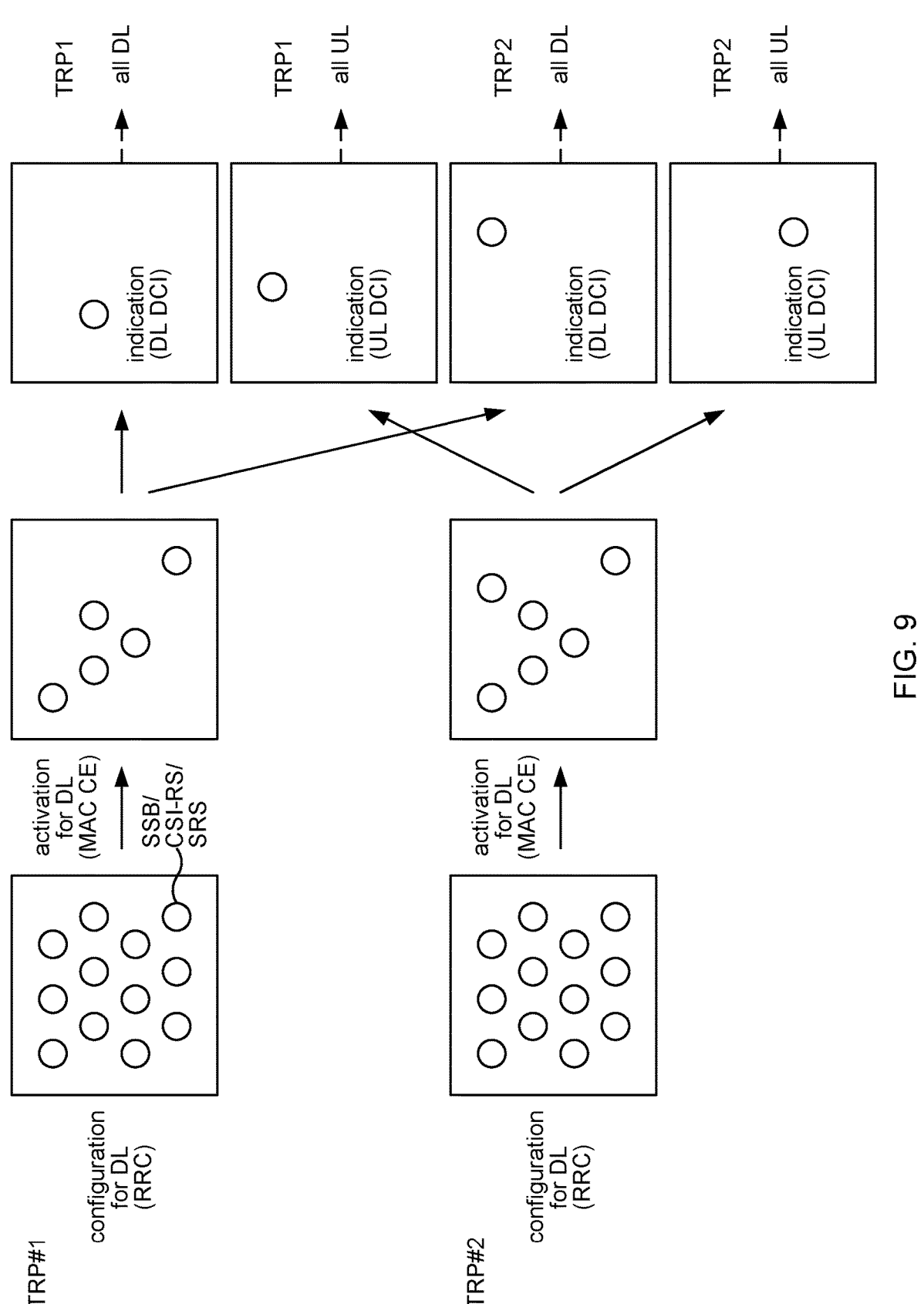
FIG. 9 is a diagram to show an example of a common beam determination method according to aspect 2-2c.

In an example of FIG. 9, a common TCI state pool for DL is configured for TRP #1, and a common TCI state pool for DL is configured for TRP #2.

A TCI state pool for the DL may be configured for TRP #1 by RRC, and a plurality of TCI states in the pool may be activated by a MAC CE. A TCI state pool for the DL may be configured for TRP #2 by RRC, and a plurality of TCI states in the pool may be activated by a MAC CE.

One (first TCI state) of the plurality of active TCI states for TRP #1 may be indicated by DL DCI for TRP #1. The indicated TCI state may be applied to all DL channels/RSs for TRP #1. One (second TCI state) of the plurality of active TCI states for TRP #1 may be indicated by DL DCI for TRP #2. The indicated TCI state may be applied to all DL channels/RSs for TRP #2.

The UE may determine the TCI state for all DL channels/RSs for each of TRP #1 and TRP #2 in accordance with this operation, or may determine a TCI state for each DL channel/RS for each of TRP #1 and TRP #2 by using TCI state operation (TCI framework) in Rel. 16.

One (third TCI state) of the plurality of active TCI states for TRP #1 may be indicated by UL DCI for TRP #1. The indicated TCI state may be applied to all UL channels/RSs for TRP #1. One (fourth TCI state) of the plurality of active TCI states for TRP #1 may be indicated by UL DCI for TRP #2. The indicated TCI state may be applied to all UL channels/RSs for TRP #2.

<<Aspect 2-2d>>

Separate (different) common TCI state pools for respective UL and DL may be used. A separate common TCI state pool for the DL may include a DL common beam, and a separate common TCI state pool for the UL may include a UL common beam.

The separate common TCI state pools may be TRP-specific pools (ninth list). A plurality of active TCI states configured/indicated by RRC/MAC CE may be common to UL and DL with all TRPs.

Figure 10:
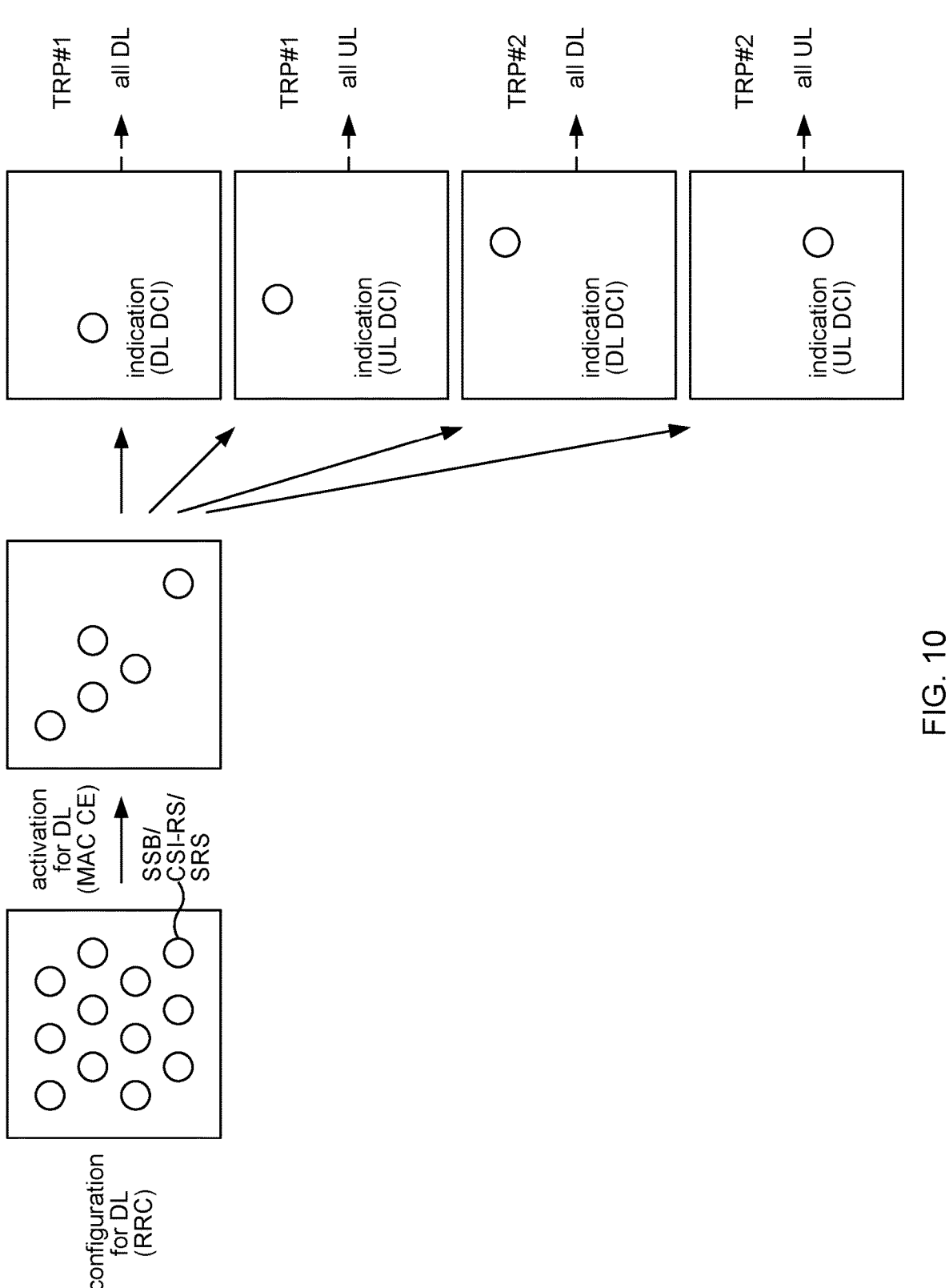
FIG. 10 is a diagram to show an example of a common beam determination method according to aspect 2-2d.

In an example of FIG. 10, a common TCI state pool for DL is configured.

A TCI state pool for the DL may be configured by RRC, and a plurality of TCI states in the pool may be activated by a MAC CE.

One (first TCI state) of the plurality of active TCI states may be indicated by DL DCI for TRP #1. The indicated TCI state may be applied to all DL channels/RSs for TRP #1. One (second TCI state) of the plurality of active TCI states may be indicated by DL DCI for TRP #2. The indicated TCI state may be applied to all DL channels/RSs for TRP #2.

The UE may determine the TCI state for all DL channels/RSs for each of TRP #1 and TRP #2 in accordance with this operation, or may determine a TCI state for each DL channel/RS for each of TRP #1 and TRP #2 by using TCI state operation (TCI framework) in Rel. 16.

One (third TCI state) of the plurality of active TCI states may be indicated by UL DCI for TRP #1. The indicated TCI state may be applied to all UL channels/RSs for TRP #1. One (fourth TCI state) of the plurality of active TCI states may be indicated by UL DCI for TRP #2. The indicated TCI state may be applied to all UL channels/RSs for TRP #2.

According to the second embodiment described above, the UE can appropriately use a common beam for multiple TRPs.

Third Embodiment

When two common beams are used, it is indefinite whether the two common beams are two common beams for respective link directions (case 1) or two common beams for respective TRPs (case 2).

14

[Case 1]

Figures 11A, 11B:
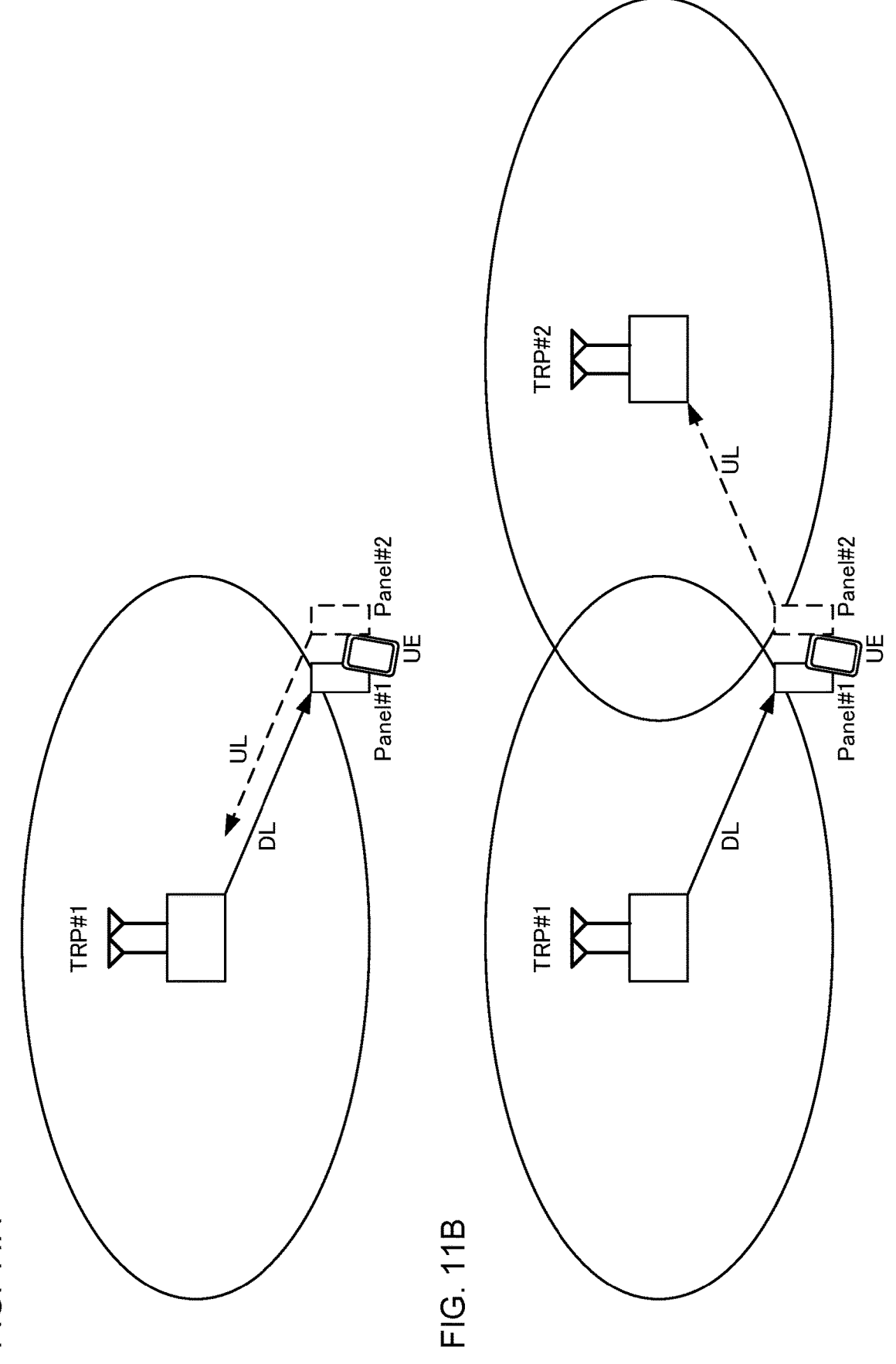
FIGS. 11A and 11B are diagrams to show an example of case 1.

In an example of FIG. 11A, in a state (single-TRP operation) in which a UE uses panel #1 for DL with TRP #1, and uses panel #2 for UL with TRP #1, UL of panel #1 receives an MPE issue. In a next example of FIG. 11B, the UE uses panel #1 for DL with TRP #1, and uses panel #2 for UL with TRP #2 (multi-TRP operation).

[Case 2]

Figure 12:
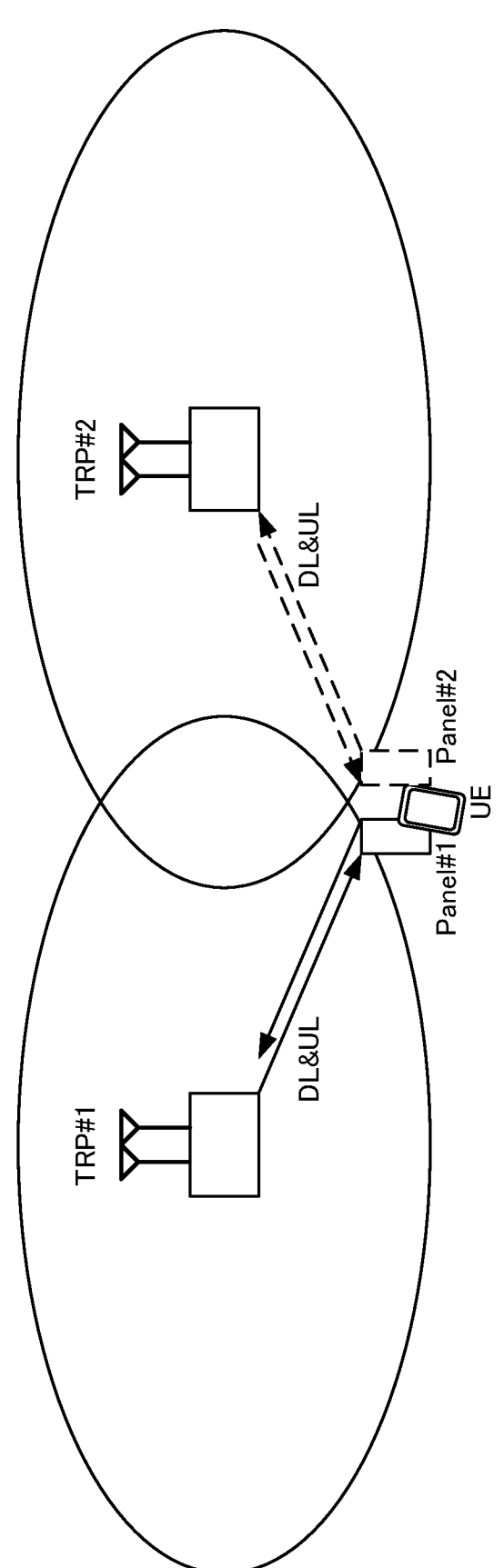
FIG. 12 is a diagram to show an example of case 2.

In an example of FIG. 12, the UE uses panel #1 for DL and UL with TRP #1, and uses panel #2 for DL and UL with TRP #2 (multi-TRP operation).

The UE may follow at least one of aspect 3-1 to aspect 3-3 below.

<<Aspect 3-1>>

RRC signaling for indicating whether the two common beams are two common beams for two link directions, or for indicating any one of the above-mentioned two cases (whether the two common beams are two common beams for two TRPs) may be configured.

<<Aspect 3-2>>

In a TCI state activation/deactivation MAC CE, a new field for indicating any one of the above-mentioned two cases may be added.

<<Aspect 3-3>>

The new field for indicating any one of the above-mentioned two cases may be added in DCI. If two TCI states are indicated, the new field may be used for determining whether the two TCI states are applied to respective DL and UL or applied to two respective TRPs.

The two operations (single-TRP operation and multi-TRP operation) in case 1 may be required to be distinguished from each other, or may not be required to be distinguished from each other. For example, the two operations may be distinguished from each other by explicit indication by RRC/MAC CE/DCI, or may be distinguished from each other by implicit indication. The explicit indication may be whether a CORESET pool index with "1" has been configured, or may be an association between a TCI state and a CORESET pool index.

According to the third embodiment described above, the UE can appropriately use two common beams.

Fourth Embodiment

A UE may support simultaneous common beam update across multiple BWPs/multiple CCs, based on at least one of the first to third embodiments.

The UE may follow at least one of aspect 4-1 and aspect 4-2 below.

<<Aspect 4-1>>

One or a plurality of serving cell lists may be configured. When the UE receives a TCI state activation/deactivation MAC CE for one serving cell in one list, the UE may apply this MAC CE (TCI state indicated by this MAC CE) to all serving cells in the list. DCI may indicate a common beam for only a scheduled serving cell.

<<Aspect 4-2>>

One or a plurality of serving cell lists may be configured. When the UE receives a TCI state activation/deactivation MAC CE for a serving cell in one list, the UE may apply this MAC CE (TCI state indicated by this MAC CE) to all serving cells in the list. When DCI indicates a common beam for a scheduled serving cell, the indicated common beam may be applied to all serving cells in the list.

A beam update timing may be applied to a plurality of serving cells in the list.

In at least one of aspect 4-1 and aspect 4-2, the UE may follow at least one of option A and option B below.

<<Option A>>

Only one common beam may be indicated.

<<Option B>>

One common beam or two common beams may be indicated. For example, if a UE panel receives MPE on CC 1, and also receives MPE on CC 2, a UL beam for the multiple CCs may be different from a DL beam for the multiple CCs.

According to the fourth embodiment described above, the UE can update a common beam simultaneously for a plurality of serving cells/BWPs, and overhead of common beam indication can be suppressed.

Fifth Embodiment

A UE capability corresponding to at least one function (characteristic, feature) in the first to fourth embodiments may be defined. When a UE has reported this UE capability, the UE may perform a corresponding function. When the UE has reported this UE capability, and a higher layer parameter corresponding to this function has been configured, the UE may perform a corresponding function. The higher layer parameter (RRC information element) corresponding to this function may be defined. When this higher layer parameter has been configured, the UE may perform a corresponding function.

The UE capability may indicate whether the UE supports this function.

The UE capability may indicate whether a TRP-specific common beam for both DL and UL is supported for a single/plurality of CCs. The UE capability may indicate whether two common beams for multiple TRPs are supported for the single/plurality of CCs.

The UE capability may indicate whether TRP-specific and link-specific common beams are supported for the single/plurality of CCs. The UE capability may indicate whether four common beams for multiple TRPs are supported for the single/plurality of CCs.

The UE capability may indicate whether common beam indication based on a MAC CE/DCI is supported for the single/plurality of CCs.

The UE capability may indicate whether indication of one common beam is supported or indication of two common beams is supported for the plurality of CCs.

The UE capability may indicate whether common beam update for a PDCCH/PDSCH/PUCCH/PUSCH is supported for the single/plurality of CCs.

The UE capability may indicate whether common beam update for a USS PDCCH/CSS PDCCH is supported for the single/plurality of CCs.

The UE capability may indicate whether common beam update for an RLM/BFD RS is supported for the single/plurality of CCs.

According to the fifth embodiment described above, the UE can achieve the above-described at least one function while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 13:
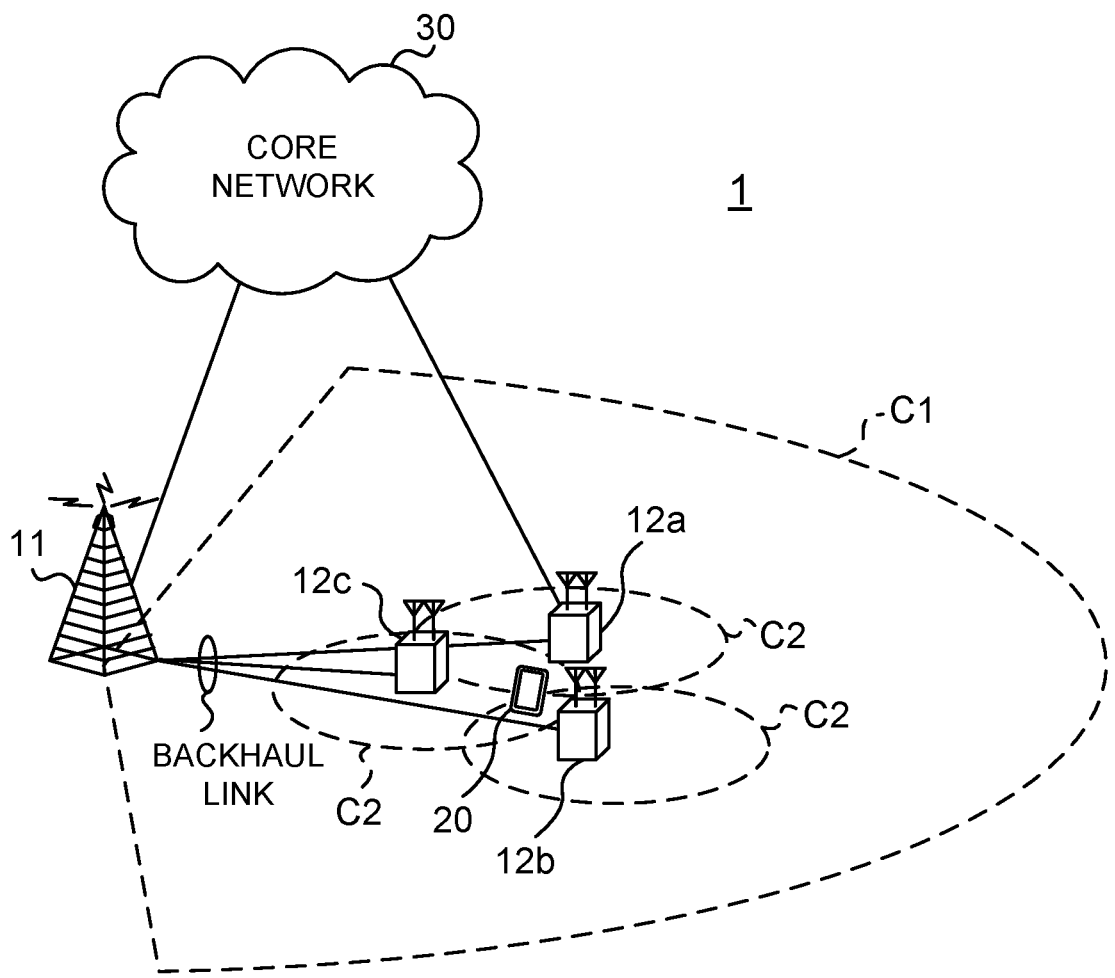
FIG. 13 is a diagram to show an example of a schematic structure of a radio communication system according to one embodiment.

FIG. 13 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 14:
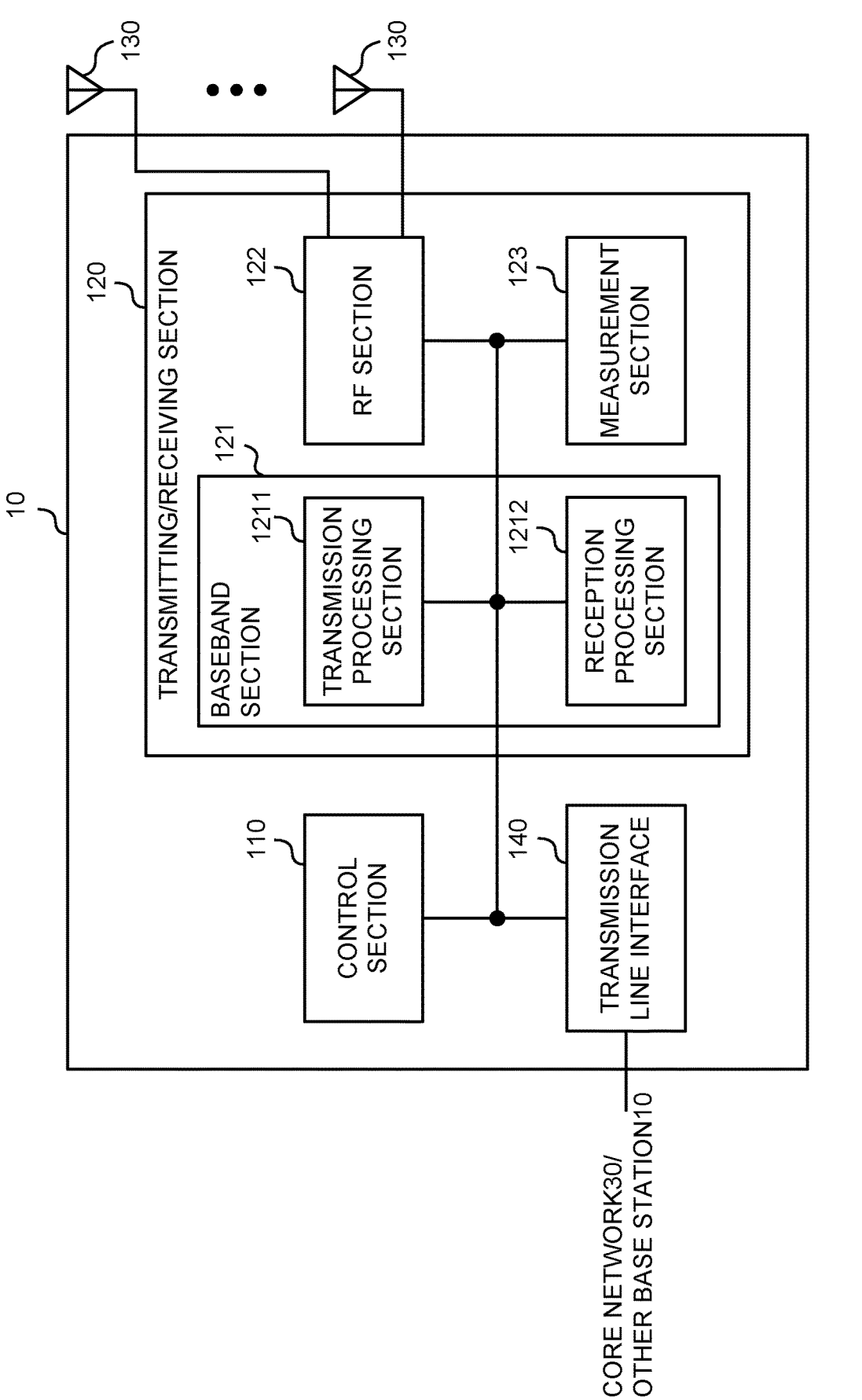
FIG. 14 is a diagram to show an example of a structure of a base station according to one embodiment.

FIG. 14 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a first and a second list of transmission configuration indication (TCI) states. The control section 110 may apply one first TCI state in the first list to uplink and downlink, and may apply one second TCI state in the second list to uplink and downlink.

The transmitting/receiving section 120 may transmit one or more lists of transmission configuration indication (TCI) states. The control section 110 may determine, on the basis of one or more pieces of downlink control information, a first TCI state and a second TCI state for downlink and a third TCI state and a fourth TCI state for uplink out of the one or more lists.

(User Terminal)

Figure 15:
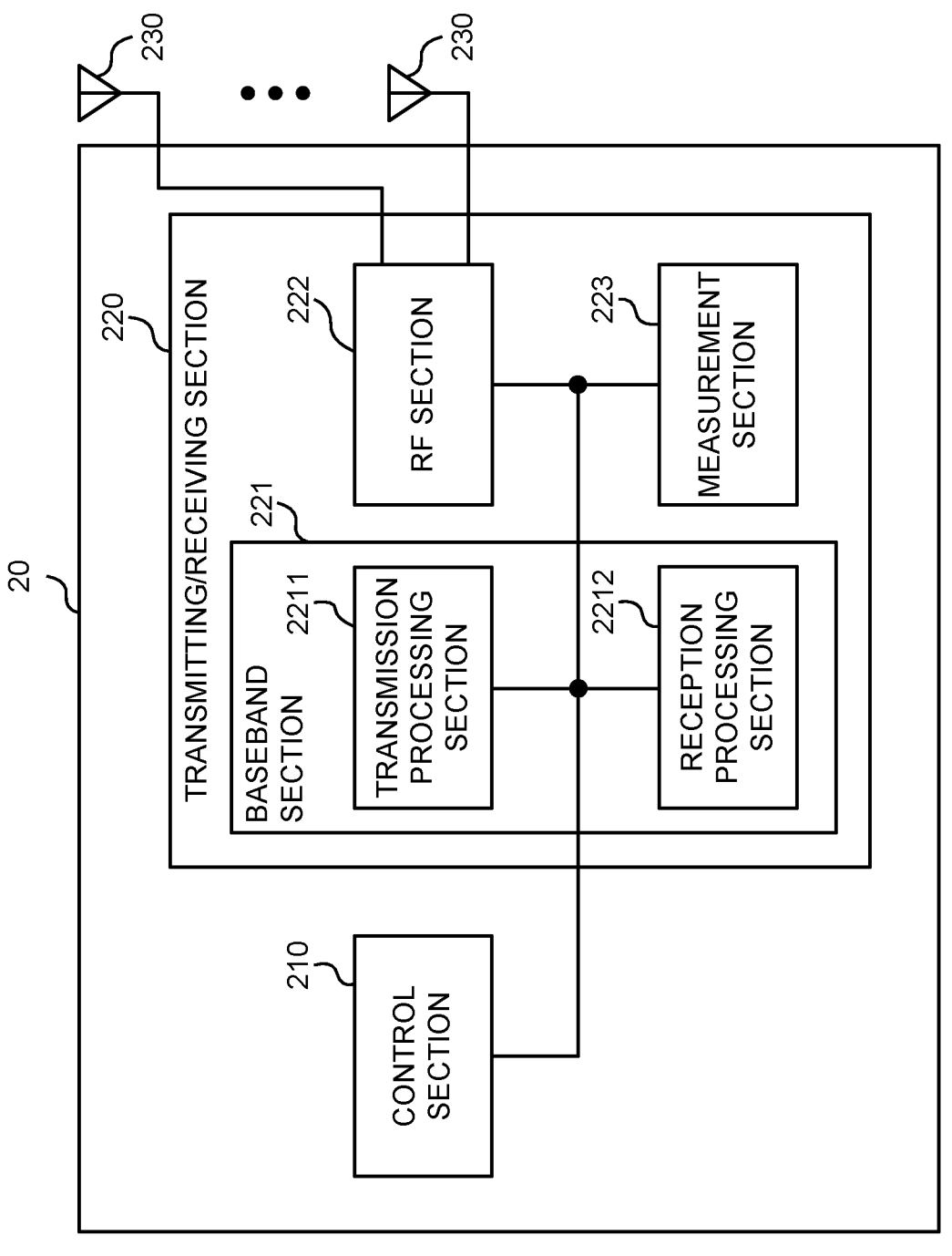
FIG. 15 is a diagram to show an example of a structure of a user terminal according to one embodiment.

FIG. 15 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive a first list and a second list of transmission configuration indication (TCI) states. The control section 210 may apply one first TCI state in the first list to uplink and downlink, and may apply one second TCI state in the second list to uplink and downlink.

The first TCI state and the second TCI state may be activated by a medium access control control element (MAC CE).

A first set of TCI states in the first list may be activated by a MAC CE, a second set of TCI states in the second list may be activated by a MAC CE, and the control section 210 may determine the first TCI state in the first set and the second TCI state in the second set on the basis of one or two pieces of downlink control information.

The first TCI state and the second TCI state may follow any one of A and B below.

(A) The first TCI state and the second TCI state correspond to two respective values of control resource set (CORESET) pool indices.

(B) The first TCI state and the second TCI state correspond to one codepoint of a TCI field.

The transmitting/receiving section 220 may receive one or more lists of transmission configuration indication (TCI) states. The control section 210 may determine, on the basis of one or more pieces of downlink control information, a first TCI state and a second TCI state for downlink and a third TCI state and a fourth TCI state for uplink out of the one or more lists.

The one or more lists may include a first list including the first TCI state, a second list including the second TCI state, a third list including the third TCI state, and a fourth list including the fourth TCI state.

The one or more lists may include at least one of a fifth list including the first TCI state and the third TCI state, a sixth list including the second TCI state and the fourth TCI state, a seventh list including the first TCI state and the second TCI state, an eighth list including the third TCI state and the fourth TCI state, and a ninth list including the first TCI state, the second TCI state, the third TCI state, and the fourth TCI state.

The first TCI state, the second TCI state, the third TCI state, and the fourth TCI state may follow any one of A and B below.

(A) The first TCI state and the third TCI state correspond to a control resource set (CORESET) pool index with "0," and the second TCI state and the fourth TCI state correspond to a CORESET pool index with "1."

(B) The first TCI state and the third TCI state correspond to one codepoint of a TCI field in downlink control information for downlink scheduling, and the second TCI state and the fourth TCI state correspond to one codepoint of a TCI field in downlink control information for uplink scheduling.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 16:
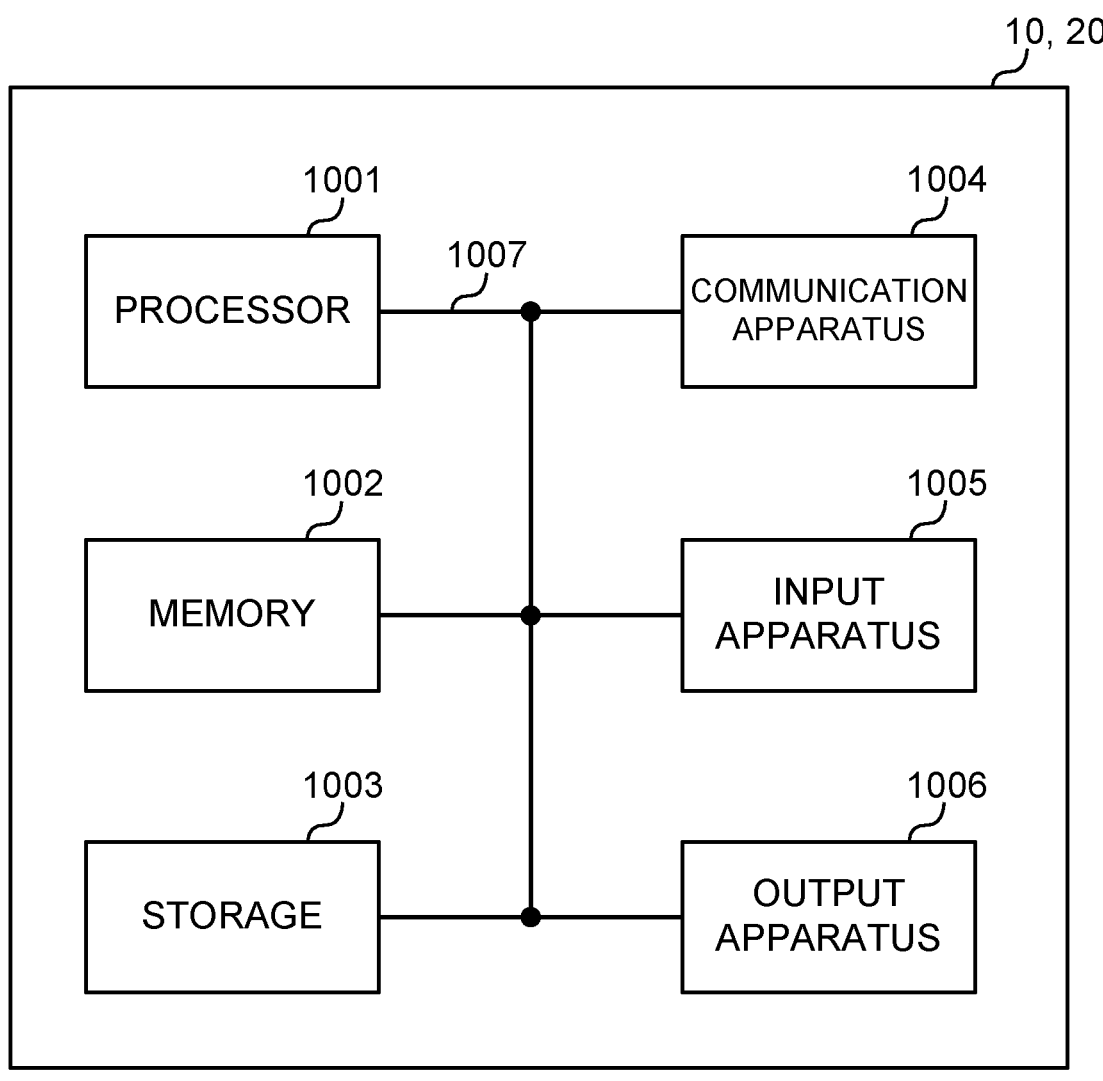
FIG. 16 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 16 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/ channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives, by higher layer signaling, a list of transmission configuration indication (TCI) states; and
a processor that applies a first TCI state in the list of TCI states to uplink and downlink, and applies a second TCI state to uplink and downlink,
wherein the first TCI state and the second TCI state correspond to one codepoint of a TCI field in downlink control information (DCI), and

wherein the first TCI state and the second TCI state correspond to two control resource set (CORESET) pool index values, respectively.

2. The terminal according to claim 1, wherein the first TCI state and the second TCI state are activated by a medium access control control element (MAC CE).

3. A radio communication method for a terminal, comprising:
receiving, by higher layer signaling, a list of transmission configuration indication (TCI) states; and
applying a first TCI state in the list of TCI states to uplink and downlink, and applying a second TCI state to uplink and downlink,
wherein the first TCI state and the second TCI state correspond to one codepoint of a TCI field in downlink control information (DCI), and
wherein the first TCI state and the second TCI state correspond to two control resource set (CORESET) pool index values, respectively.

4. A base station comprising:
a transmitter that transmits, by higher layer signaling, a list of transmission configuration indication (TCI) states; and
a processor that determines a first TCI state and a second TCI state, in the list of TCI states, that are applied to uplink and downlink,
wherein the first TCI state and the second TCI state correspond to one codepoint of a TCI field in downlink control information (DCI), and
wherein the first TCI state and the second TCI state correspond to two control resource set (CORESET) pool index values, respectively.

5. A system comprising a terminal and a base station, wherein
the terminal comprises:
a receiver that receives, by higher layer signaling, a list of transmission configuration indication (TCI) states; and
a processor that applies a first TCI state in the list of TCI states to uplink and downlink, and applies a second TCI state to uplink and downlink,
wherein the first TCI state and the second TCI state correspond to one codepoint of a TCI field in downlink control information (DCI), and
wherein the first TCI state and the second TCI state correspond to two control resource set (CORESET) pool index values, respectively, and
the base station comprises:
a transmitter that transmits the list of TCI states by the higher layer signaling; and
a processor that determines the first TCI state and the second TCI state.

* * * * *